(12) United States Patent
Laravine et al.

(10) Patent No.: US 11,376,556 B2
(45) Date of Patent: Jul. 5, 2022

(54) DEVICE FOR SHAKING AND SAMPLING BIOLOGICAL LIQUIDS

(71) Applicant: HORIBA ABX SAS, Montpellier (FR)

(72) Inventors: Jean Emmanuel Laravine, Vestric et Candiac (FR); Charlène Muzellier, Saussines (FR)

(73) Assignee: HORIBA ABX SAS, Montpellier (FR)

( * ) Notice: Subject to any disclaimer, the term of this patent is extended or adjusted under 35 U.S.C. 154(b) by 710 days.

(21) Appl. No.: 16/320,956

(22) PCT Filed: Jul. 25, 2017

(86) PCT No.: PCT/FR2017/052074
§ 371 (c)(1),
(2) Date: Jan. 25, 2019

(87) PCT Pub. No.: WO2018/020147
PCT Pub. Date: Feb. 1, 2018

(65) Prior Publication Data
US 2019/0160442 A1 May 30, 2019

(30) Foreign Application Priority Data

Jul. 28, 2016 (FR) ...................................... 1657321

(51) Int. Cl.
*G01N 35/04* (2006.01)
*B01F 31/20* (2022.01)
(Continued)

(52) U.S. Cl.
CPC ............ *B01F 31/23* (2022.01); *B01F 31/275* (2022.01); *G01N 35/04* (2013.01); *G01N 35/1079* (2013.01); *G01N 2035/00524* (2013.01)

(58) Field of Classification Search
CPC .. B01F 11/0017; B01F 11/0037; B01F 31/23; B01F 31/275; G01N 1/38; G01N 35/04;
(Continued)

(56) References Cited

U.S. PATENT DOCUMENTS 388,373 A * 8/1888 Robinson ............ B01F 11/0017
366/210
634,492 A * 10/1899 Wright ...................... D06F 7/00
68/38
(Continued)

FOREIGN PATENT DOCUMENTS

CN 104823057 A 8/2015
EP 0 549 573 A1 6/1993
(Continued)

OTHER PUBLICATIONS

International Search Report as cited in the International Application No. PCT/FR2017/052074, dated Sep. 9, 2017.
(Continued)

*Primary Examiner* — David L Sorkin
*Assistant Examiner* — Noor F Ahmad
(74) *Attorney, Agent, or Firm* — ArentFox Schiff LLP

(57) ABSTRACT

A device for shaking and sampling biological liquids that is able to take a sample of a biological liquid in a tube including a shaker designed to mix a rack holding one or more tubes by performing a succession of tilting movements between two shaking positions. The shaker is also arranged to tilt beyond the shaking position furthest away from the insertion position of a rack to discharge same by gravity.

15 Claims, 9 Drawing Sheets

(51) Int. Cl.
*B01F 31/23* (2022.01)
*G01N 35/10* (2006.01)
*G01N 35/00* (2006.01)

(58) Field of Classification Search
CPC ............... G01N 35/1079; G01N 35/10; G01N 2035/00524
USPC .................... 366/185, 209–211, 216, 239
See application file for complete search history.

(56) References Cited

U.S. PATENT DOCUMENTS

| | | | | |
|---|---|---|---|---|
| 2,002,323 | A * | 5/1935 | Kurz | A47J 43/042 366/211 |
| 3,735,964 | A * | 5/1973 | Lorenzen | B01F 11/0017 366/211 |
| 5,918,979 | A * | 7/1999 | Martin | B01F 11/0008 366/211 |
| 6,848,824 | B1 * | 2/2005 | Peters | A23B 4/26 366/239 |
| 8,016,218 | B1 * | 9/2011 | Friedman | B01F 11/0017 241/175 |
| 8,852,505 | B2 * | 10/2014 | Dupoteau | B01F 9/002 422/63 |
| 2005/0141341 | A1 * | 6/2005 | Greco | B01F 15/00779 366/209 |
| 2010/0064826 | A1 | 3/2010 | Champseix et al. | |

FOREIGN PATENT DOCUMENTS

| | | |
|---|---|---|
| FR | 2 859 285 A1 | 3/2005 |
| WO | 2014072616 A | 5/2014 |

OTHER PUBLICATIONS

First Office Action dated Feb. 9, 2022 for Chinese Application No. 201780044610.3.

* cited by examiner

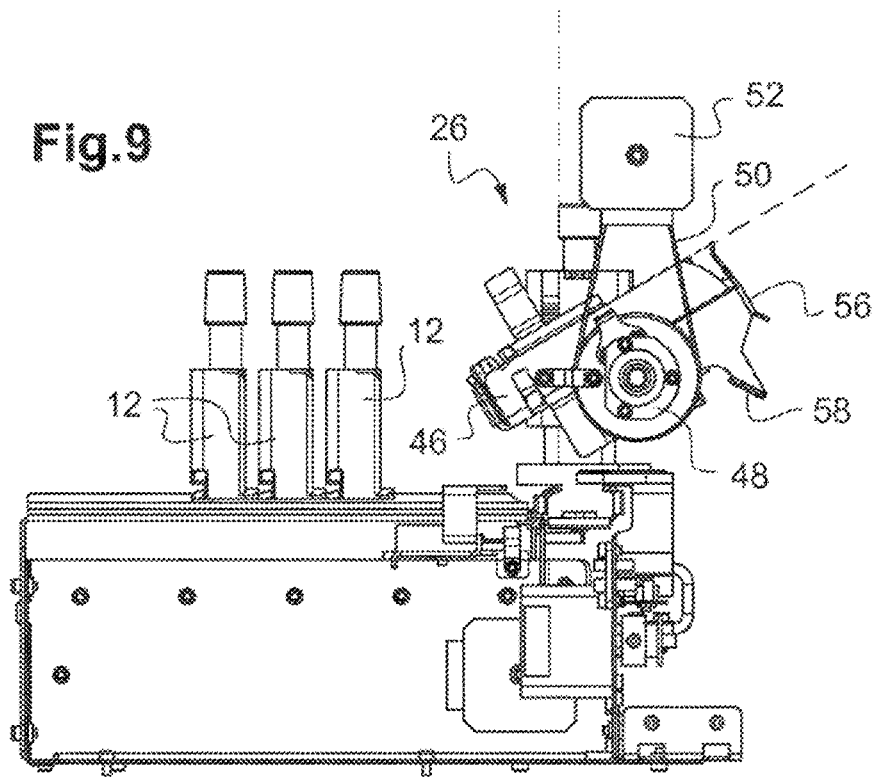
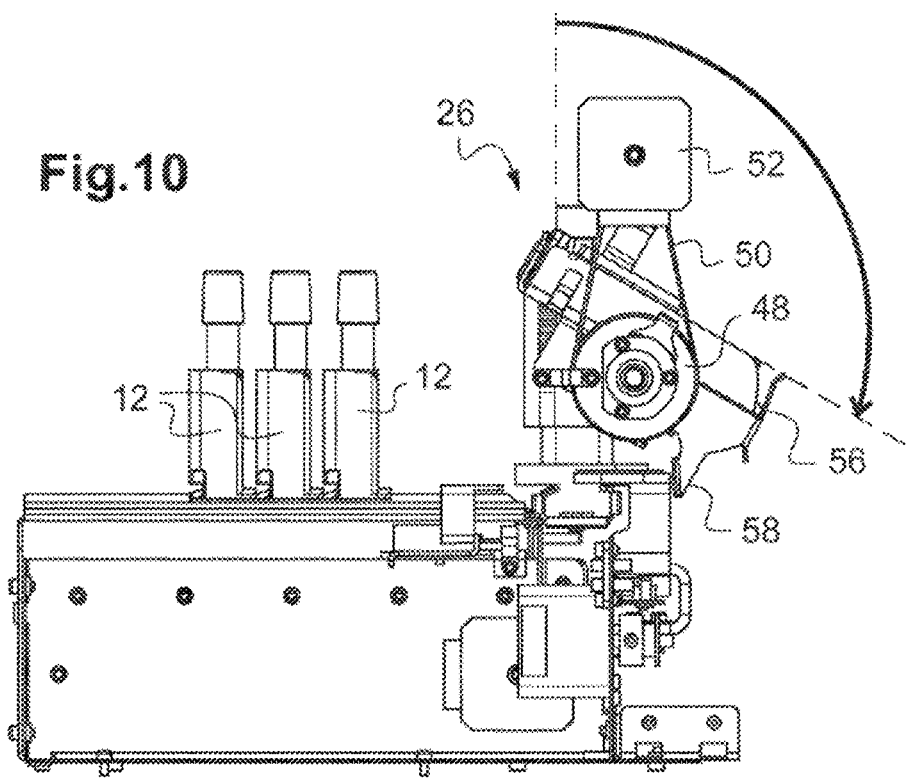

DEVICE FOR SHAKING AND SAMPLING BIOLOGICAL LIQUIDS

CROSS-REFERENCE TO RELATED APPLICATIONS

This application is a 35 U.S.C. § 371 National Phase of PCT Application No. PCT/FR2017/052074, filed on Jul. 25, 2017, which claims priority to FR Application No. 1657321 filed Jul. 28, 2016, the disclosure of which is hereby incorporated by reference in its entirety.

The invention relates to the domain of sample taking for biological liquids, in particular body fluids such as blood.

In recent decades, analysis equipment for blood products has undergone numerous developments. Said equipment now covers a very wide range of performance levels, from small, limited-functionality machines to complex networked equipment that is able to automate almost the entire sample processing chain.

For entry-level products, reliability and cost control have become key elements in determining the value of products.

The invention is intended to improve the situation. For this purpose, the invention proposes a shaking and sample-taking device for biological liquids that is designed to take samples of biological liquids in a tube, comprising a shaker that is designed to mix a rack holding one or more tubes by performing a succession of tilting movements between two shaking positions, characterized in that the shaker is also arranged to tilt beyond the shaking position furthest away from the insertion position of a rack to remove same by gravity.

This device is particularly advantageous because it provides a sampling member that requires just one actuator that moves the tube to take the sample. Consequently, the sampling member is static, which improves reliability. Furthermore, the fact of requiring just one actuator helps to reduce production costs, assembly times and essential mechanical adjustments.

In different variants, the device can have one or more of the following features:
- the shaker includes an open support, and the device also has a cover that is arranged such as to prevent the rack from coming out of the shaker during shaking thereof and that is mounted rotatingly on the shaker in order to release the rack through the opening in the support when same is tilted beyond the shaking position furthest away from the insertion position of the rack,
- the cover has a portion that butts against the shaker when the shaker reaches the shaking position furthest away from the insertion position of a rack, and a spring arranged to be compressed when the shaker tilts beyond this position, such that the cover does not prevent the rack from coming out,
- the device also has a slope arranged to receive a rack discharged from the shaker and to guide same towards an outlet of the device,
- the slope has an incline oriented towards the outlet such as to guide a rack discharged from the device,
- the shaker performs a succession of tilting movements between two shaking positions located respectively at 0° and 120° in relation to the insertion position of the rack in the shaker,
- the device also has retractable stops arranged such as to prevent the rack from interfering with the shaker when the latter is already holding a rack,
- the device also has a static perforator that is designed to pierce a stopper of a tube to be sampled, an aspirator that is designed to take a sample from a tube pierced by the perforator through this latter, and a pusher comprising a single actuator and designed to push a tube in front of the perforator against said perforator and to bring same back, and
- the pusher is moved by a part linked to a plate sliding on two rods and driven by a cam driven by a motor, and a return device with one end linked to the part by a block linked to springs and arranged to butt against a stop in order to prevent the end from moving while the pusher continues to move.

The invention also relates to a shaking and sample-taking method for biological liquids including the following operations:
- inserting a rack into a shaker of the device,
- mixing the rack holding one or more tubes by causing the shaker to perform a succession of tilting movements between two shaking positions,
- taking at least one sample of biological liquids from one of the tubes shaken,
- tilting the shaker beyond the shaking position furthest away from the insertion position of a rack, and
- discharging the rack by gravity.

Other features, objectives and advantages of the invention are better set out in the description below of non-limiting illustrative examples with reference to the drawings, in which.

Figure 3:
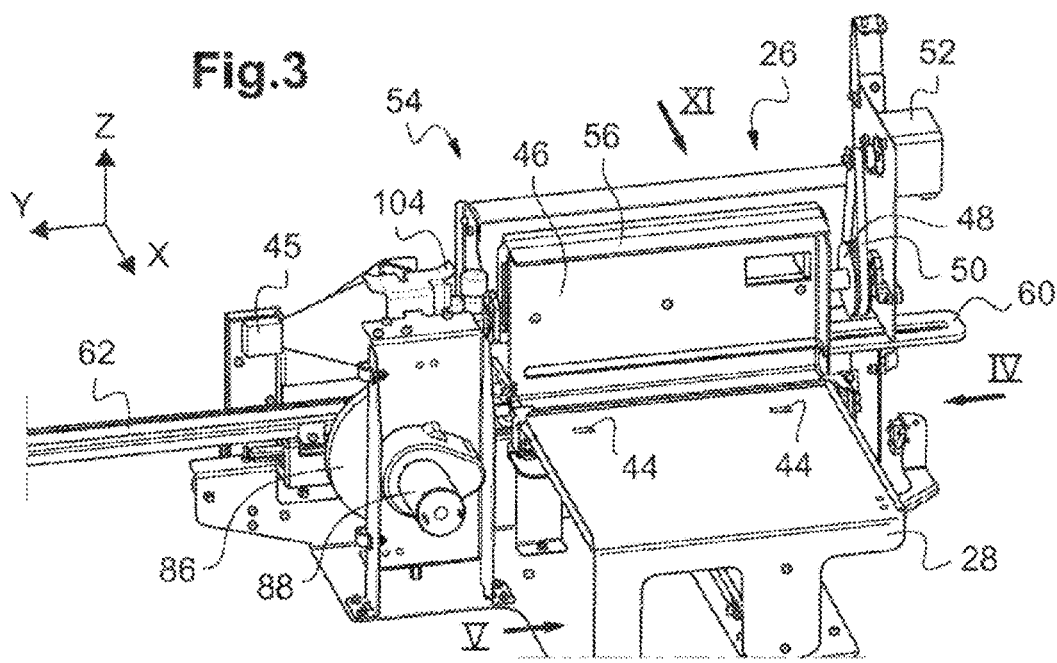
FIG. 3 is a perspective view of a portion of FIG. 2.
Figure 4:
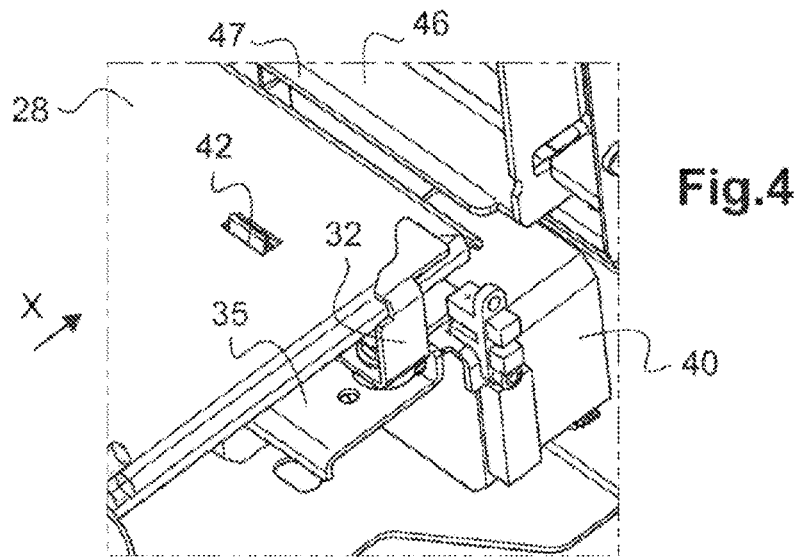
FIG. 4 is a partial perspective view of FIG. 3, according to the arrow IV.
Figure 5:
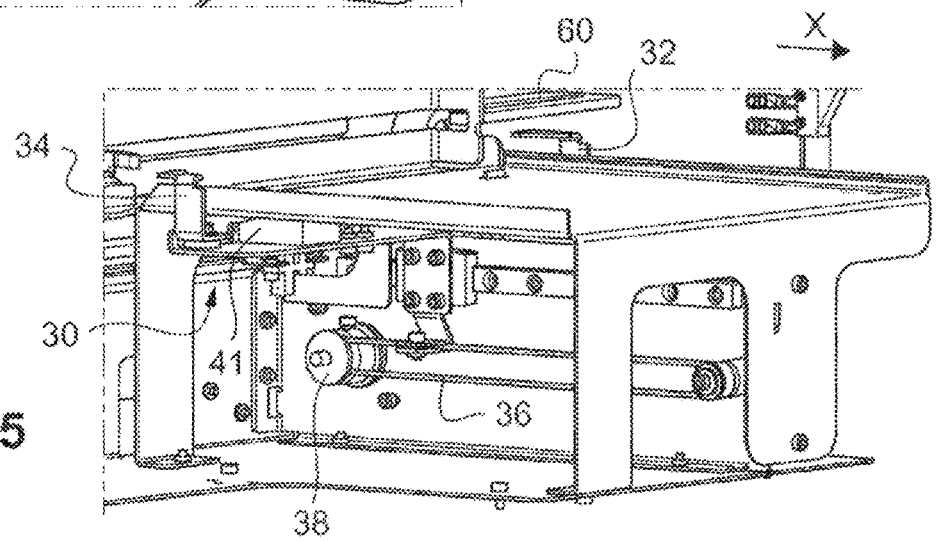
FIG. 5 is a partial perspective view of FIG. 3, according to the arrow V.
Figure 6:
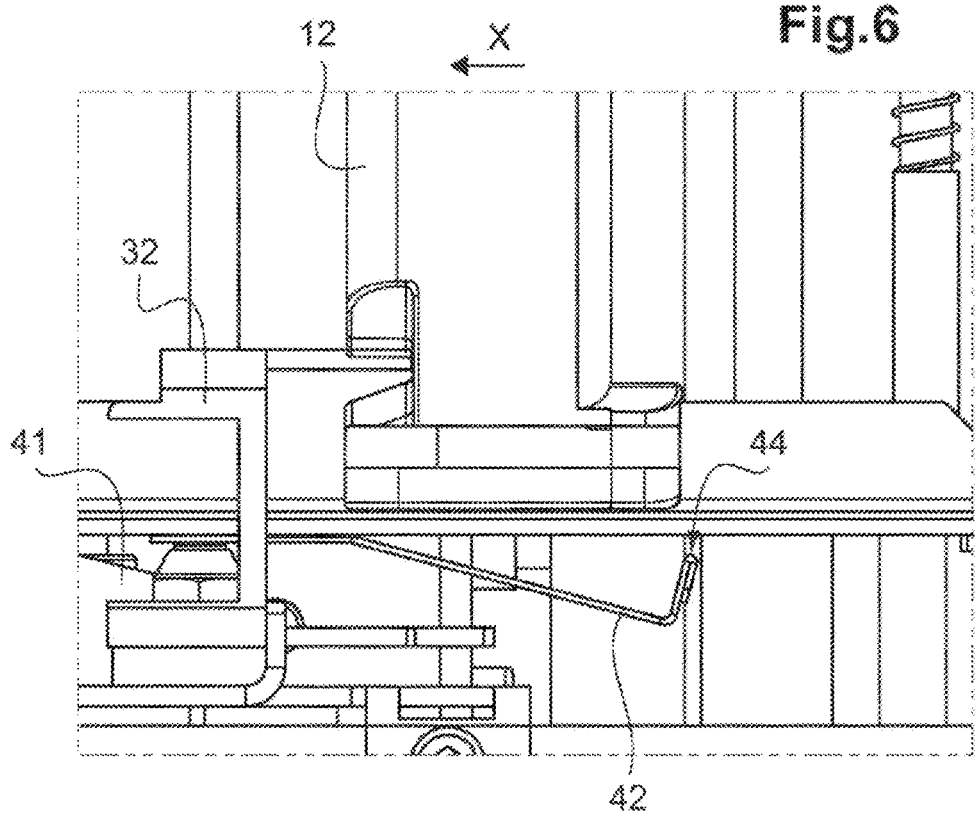
Figure 7:
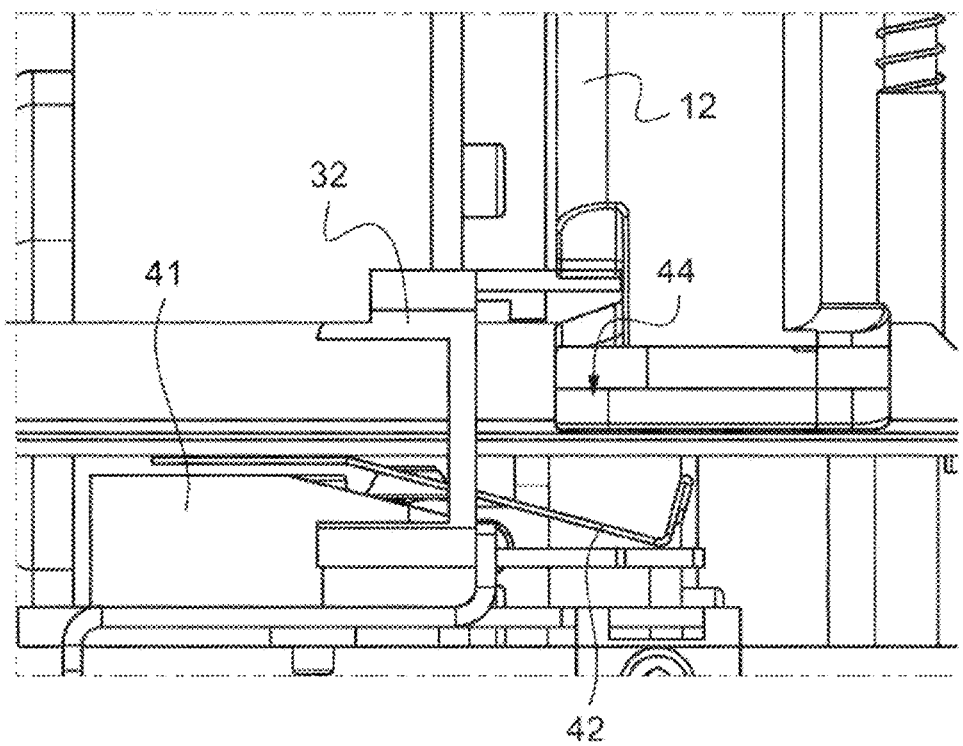
Figure 8:
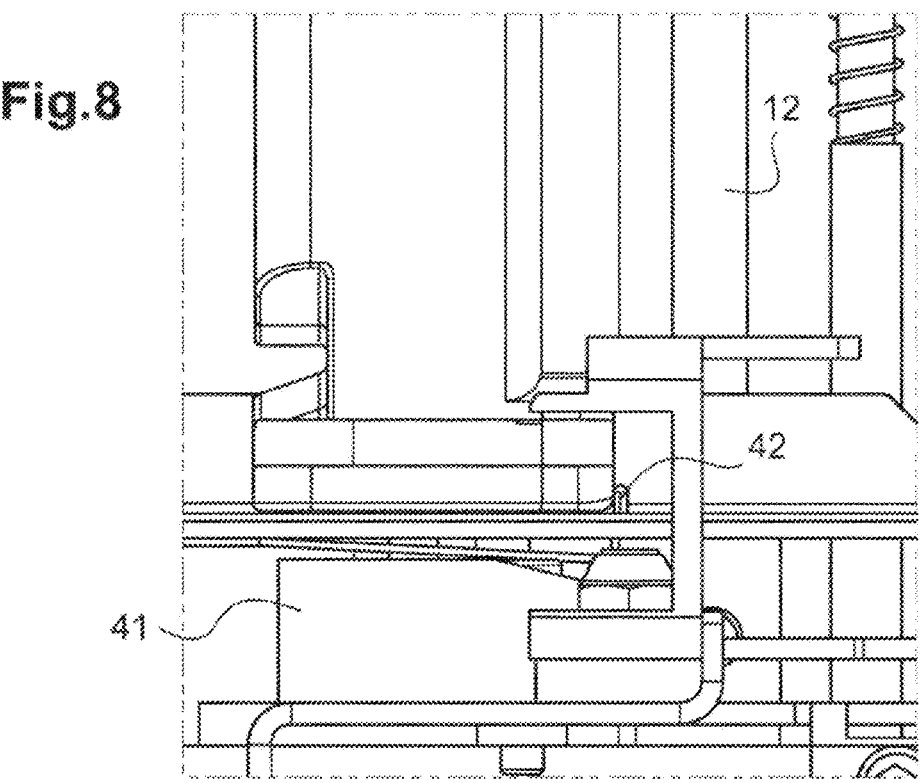
Figure 11:
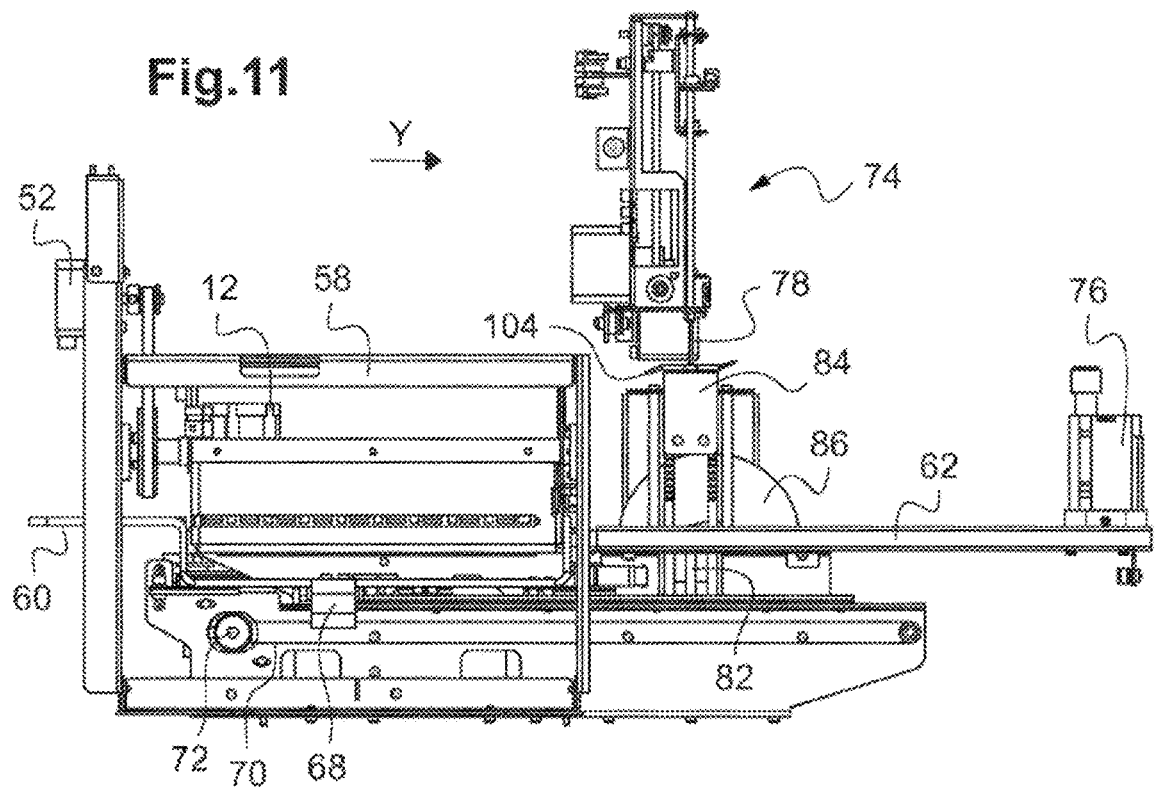
Figure 12:
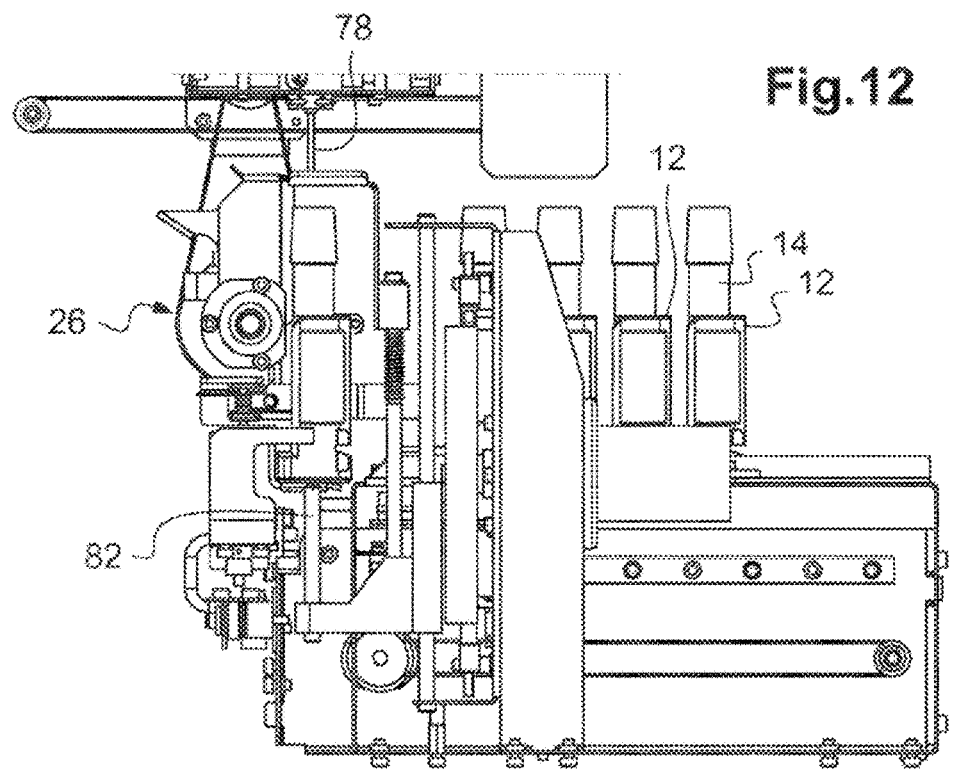
Figure 13:
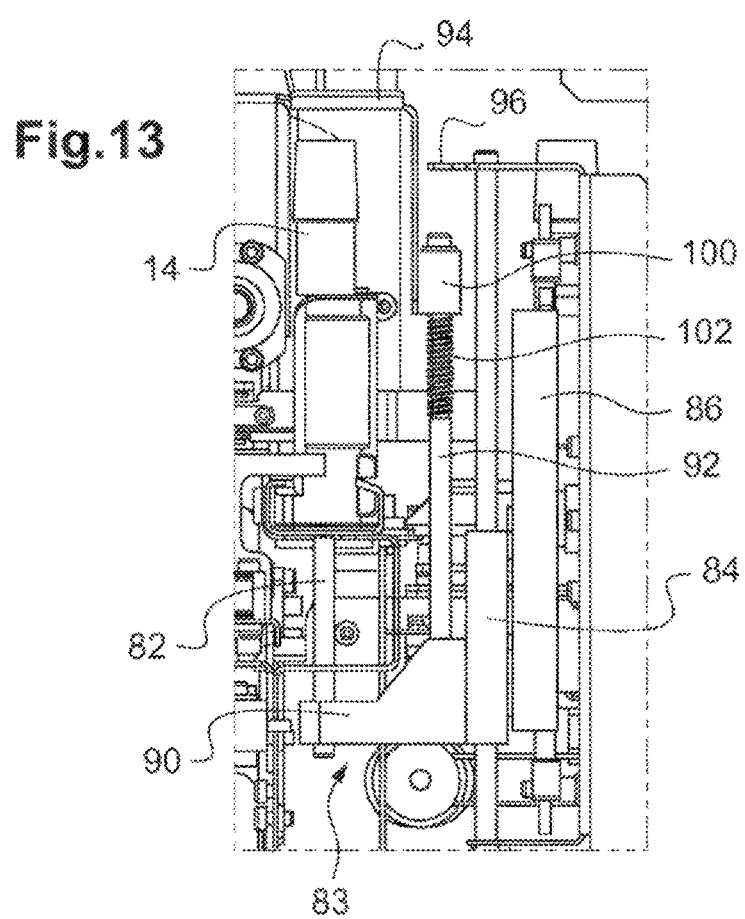
Figure 14:
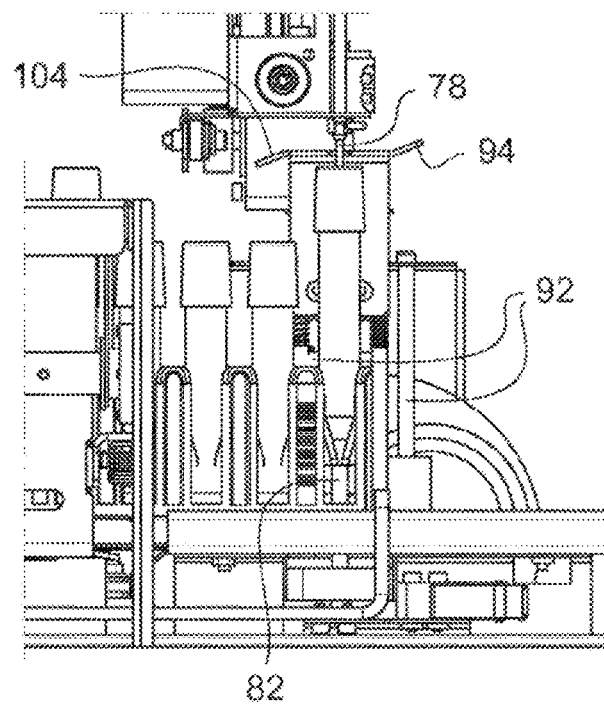
Figure 15:
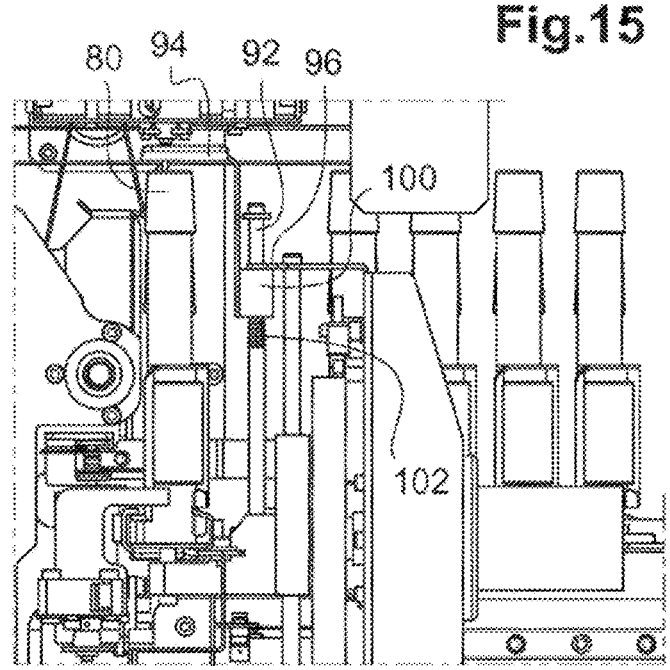
Figure 16:
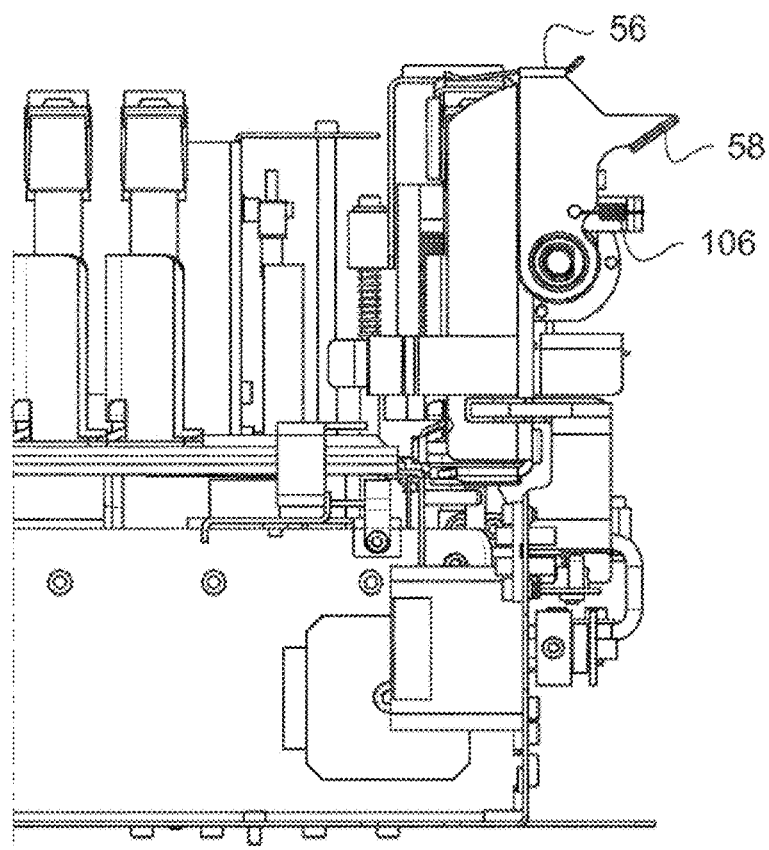
Figure 17:
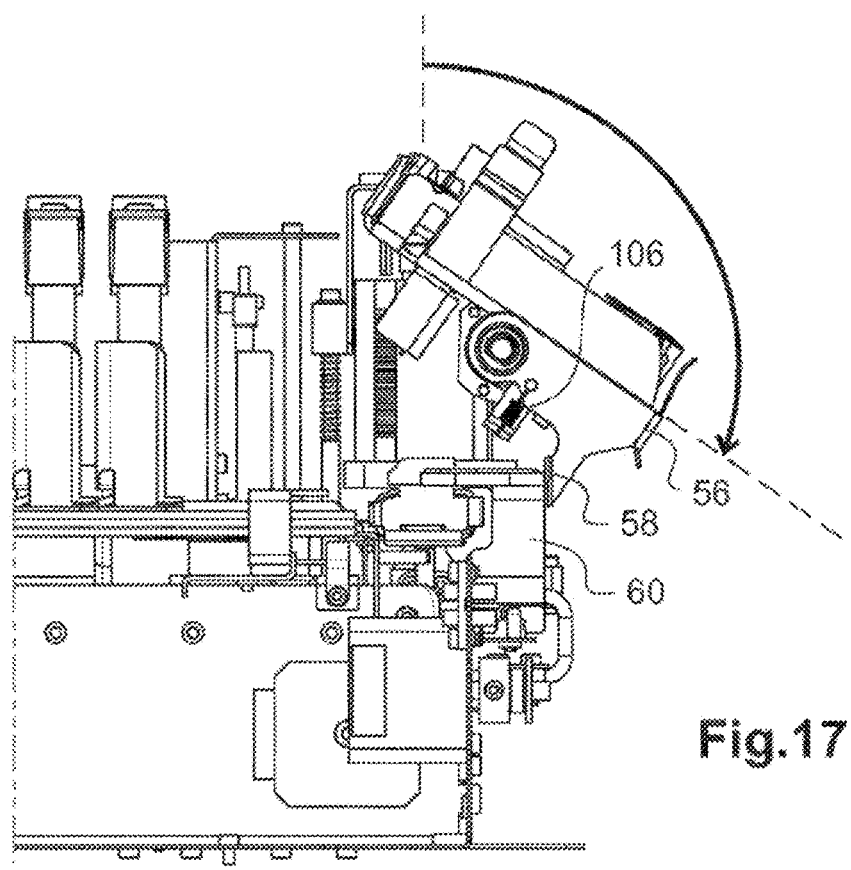
Figure 18:
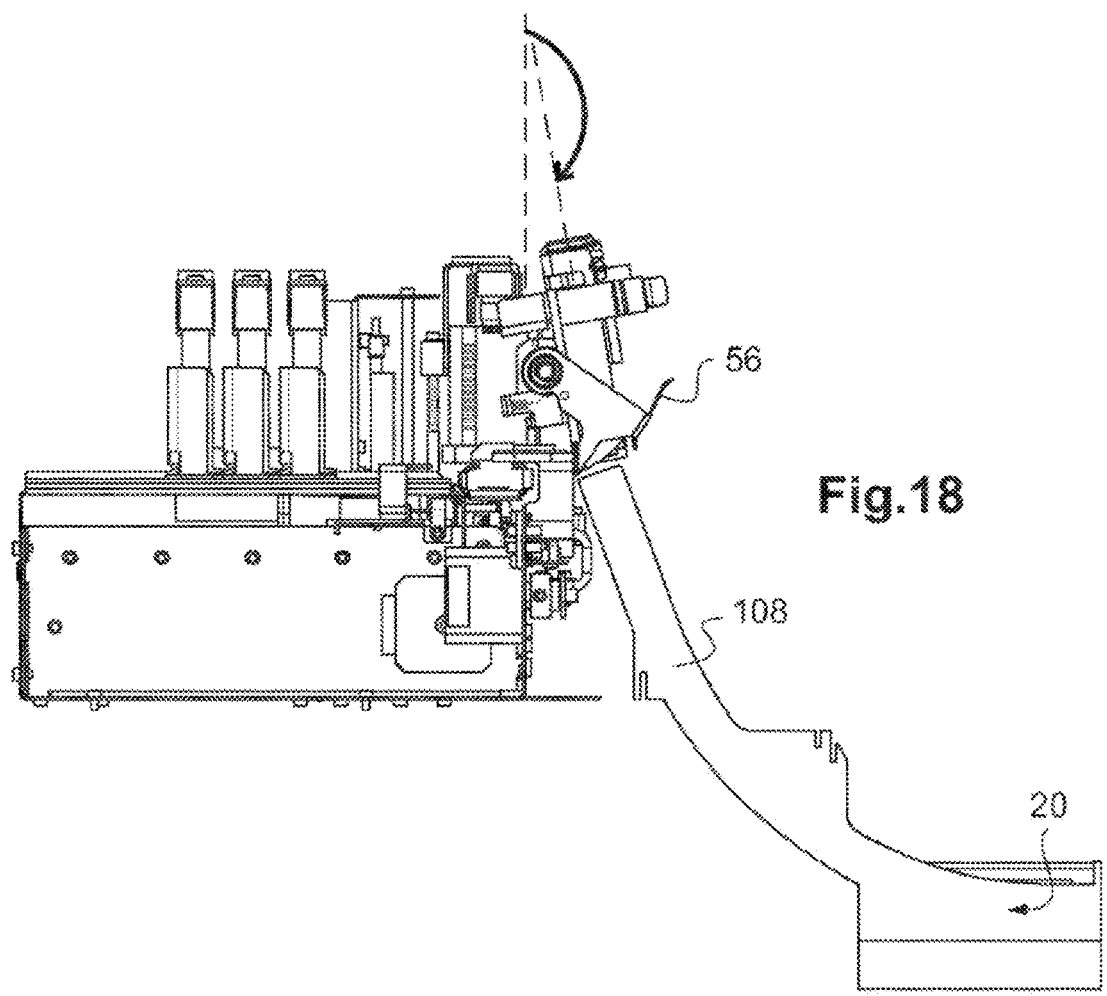
Figure 19:
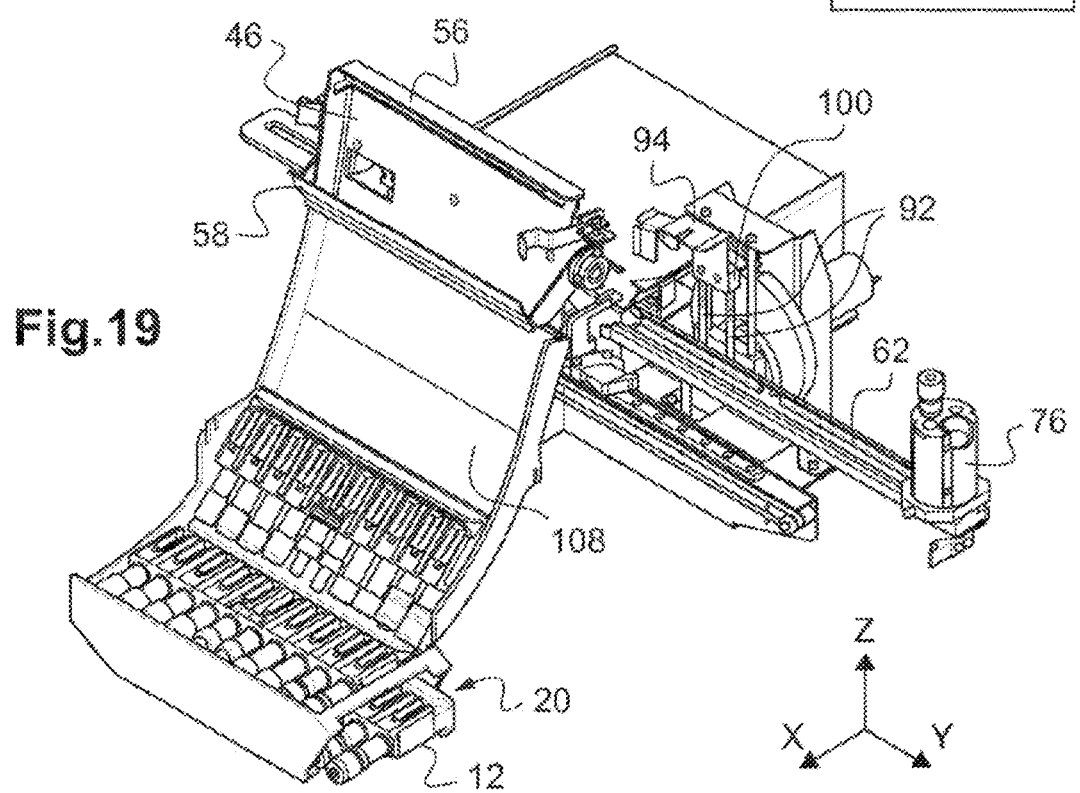

FIGS. 6 to 8 are side views of FIG. 3 at different stages of progression of a tube rack, FIGS. 9 and 10 are side views of FIG. 3 at different stages of shaking of a tube rack, FIG. 11 is a view according to the arrow XI in FIG. 3, FIG. 12 is a front view of the sampling member, FIGS. 13 to 15 are magnified views of a portion of FIG. 12 at different stages of sampling of a tube, FIGS. 16 to 18 are side views of FIG. 3 at different stages of discharging of a tube rack, and FIG. 19 is an opposing perspective view of FIG. 3 showing the discharged tube racks.

Most of the elements in the drawings and the description are well known, and as such can be used both to better understand the present invention and to contribute to the definition of same, as appropriate.

Figure 1:
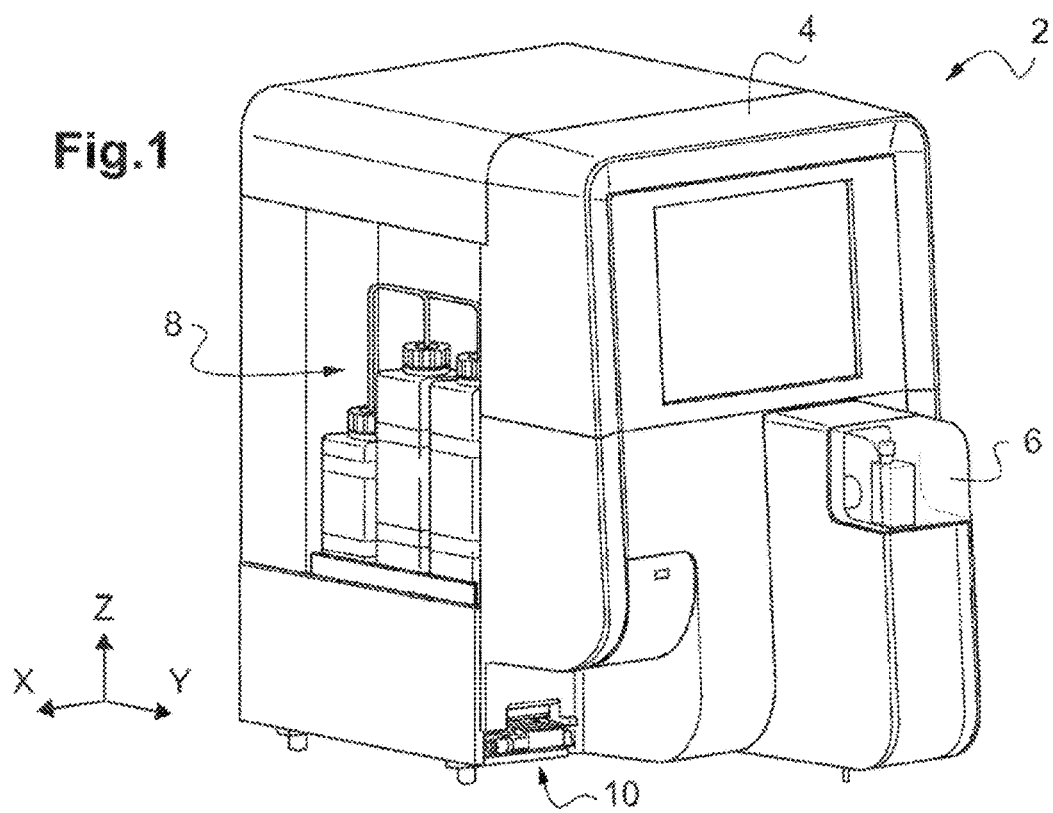
FIG. 1 is a perspective view of the device according to the invention.

FIG. 1 is a perspective view of a shaking and sample-taking device for biological liquids 2 according to the invention.

The device 2 includes a casing 4 that has an overall parallelepiped shape and a trapdoor 6 for inserting an "urgent" tube (or a tube that is not compatible with the racks, such as a pediatric tube), a space 8 for reagents, an outlet 10 for retrieving the racks 12 analyzed and a space (not shown in FIG. 1) for inserting the racks 12 to be analyzed. The racks 12 are arranged to receive the tubes 14 containing the biological liquids, such as blood products, that the device 2 is designed to sample and analyze.

Figure 2:
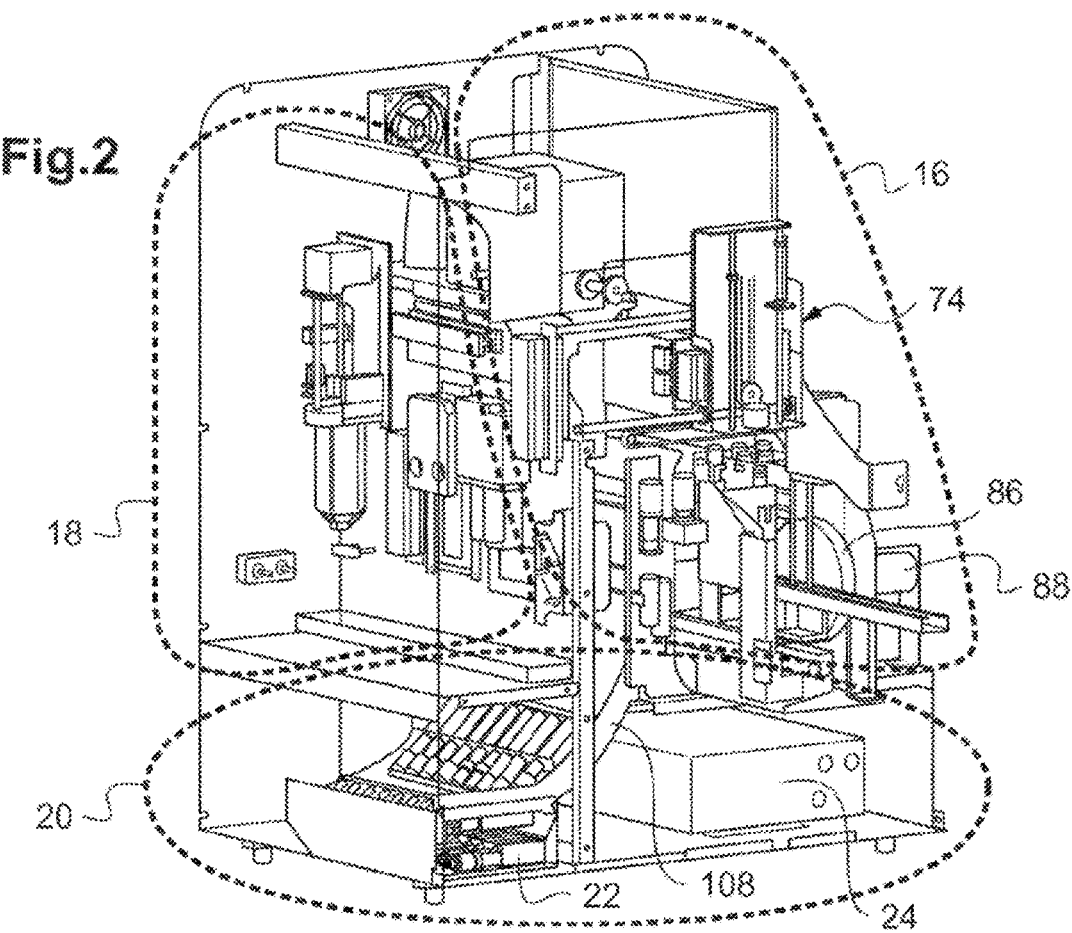
FIG. 2 is a view similar to FIG. 1, with the casing removed.

FIG. 2 is a view similar to FIG. 1, in which the casing 4 has been removed. As shown, the inside of the device 2 has an upper portion divided into a zone 16 for shaking and sampling the tubes 14 and an analysis zone 18, and a lower portion 20 divided into an outlet zone 22 and an electrical power supply zone 24.

The device 2 is arranged to operate sequentially, i.e. a rack 12 (or urgent tube) is inserted, shaken (urgent tubes are shaken before insertion), sampled, analyzed and removed from the device 2 before the next rack 12 is analyzed, etc.

For this reason, the device 2 is described in this order, detailing each related portion of the device 2. Accordingly, FIGS. 3 to 8 describe the portion of the zone 16 used to load the racks 12 into the shaker 26. The portion of the device 2 used for loading includes a tray 28. The tray 28 holds the racks 12 at the end furthest away from the shaker 26.

The racks 12 can be inserted in any space on the tray 28 and are pushed by a loading assembly 30 that includes two fingers 32 and 34 linked by a plate 35 beneath the tray 28 to a belt 36 driven by a motor 38. The fingers 32 and 34 are mounted rotatingly in relation to the plate 35 such that, when the loading assembly 30 moves back to load the next rack 12, the fingers 32 and 34 move around said rack to the rear thereof. On the side of the finger 32, the loading assembly has a detector 40 emitting an infrared beam that is used to determine that the finger 32 has moved behind a rack 12. The loading assembly 30 is then stopped.

Once the loading assembly 30 has detected that the fingers 32 and 34 have moved behind a rack 12, the loading assembly inverts the operating direction of the motor 38 so that the fingers 32 and 34 push the rack 12 towards the shaker 26. The plate 35 also holds two parallelepipedic plastic ramps 41, in which the end opposite the plate 35 and closest to the shaker 26 is beveled. This beveled portion is such that, when the loading assembly 30 pushes a rack 12 towards the shaker 26, the beveled portion gradually raises two L-shaped stops 42 (see FIGS. 6 to 8) through holes 44 in the tray 28. Thus, at the end-of-travel position of the loading assembly 30, the stops 42 prevent the other racks 12 from coming into contact with the shaker 26.

The shaker 26 includes a substantially L-shaped support 46. The rack 12 Is vertical when inserted, i.e. the tubes 14 lie along the direction Z, the stoppers being located at the top. The support 46 is slightly lower than the tray 28 and has a fold 47 forming a tab (shown in FIG. 4) that helps to retain the rack 12 once the rack has been placed in the shaker 26. The tab 47 does not hinder insertion on account of the slight offset between the support 46 and the tray 28.

The system 2 advantageously has a barcode reader 45 positioned at the sampling station and used to positively identify (i.e. without moving the tube 14 between identification and sampling) of the type of rack 12 (barcode on the rack 12) and to detect the presence of a tube 14 and to identify same where applicable.

The shaker 26 then performs several tilting movements of the rack 12 between two positions:
  a first position in which the tubes 14 form an angle of approximately 0° with the insertion position of the rack 12 (shown using a dotted line in FIG. 9), and
  a second position in which the tubes 14 form an angle of approximately 120° with the insertion position of the rack 12 (FIG. 10).

In a variant and depending on how the racks 12 are inserted into the shaker 26, the angles may be different and may vary between −180° and 180° with the insertion position of the rack 12.

The tilting movement between the first and second positions is performed by applying a rotational movement to the gear wheel 48 meshed with a belt 50 driven by a motor 52. To prevent the rack 12 from falling when the support 46 is inclined, a cover 54 is mounted on the shaker 26. The cover 54 comprises two portions 56 and 58, the portion 56 being used to hold the rack 12, while the role of the portion 58 is explained using FIGS. 16 to 19.

Once the shaking is complete, the rack 12 is gradually moved in the direction Y by a guide 60 on a rail 62. FIG. 11 more clearly shows this movement and the relationship between shaking and sampling. The guide 16 is substantially U-shaped with two arms 64 and 66 at the ends that surround the rack 12, and the guide includes a link 68 to a belt 70 driven by a motor 72. Thus, when the guide 60 is driven in the direction Y, the arm 64 pushes the rack towards the sampling zone 74. Once all of the tubes 14 have been sampled, the guide 60 is driven in the other direction and the arm 66 returns the rack 12 to the shaker 26 so that the rack can be removed from the device 2. As shown on the right-hand side of FIG. 11, the portion handling urgent tubes is shown. Urgent tubes inserted via the trapdoor 6 are received in a cylinder 76 having a barcode associated with the type of urgent tube. To sample the urgent tube, the cylinder 76 is brought to the sampling zone 74 by the guide 60, of which the arm 66 engages with the cylinder 76. In the example described herein, if the device 2 detects that an urgent tube has been inserted, the device completes sampling of the current tube 14 in a loaded rack 12, where applicable, then handles the urgent tube. Since the device 2 is designed to perform shaking/sampling cycles tube by tube in a given rack, inserting the urgent tube does not cause any problems. Urgent tubes can be inserted with or without stoppers.

The sampling process is explained below with reference to FIGS. 12 to 15. Unlike the majority of existing devices, sampling in the device 2 according to the invention is performed:
  with the tubes turned upwards, which reduces the dead volume and the risk of leakage,
  with a static sampling assembly having a single actuator.

Indeed, the arrangement of the device 2 helps to simplify sampling, thereby making the device more reliable and more economic. Accordingly, the sampling zone includes a static perforator 78 and an aspirator 80, and it is the tube 14 that is moved to perform the sampling. Since the rack 12 is pushed by the arm 64, the positioning of each tube 14 is known and can be arranged precisely beneath the perforator 78. A pusher 82 then moves the tube 14 in the direction Z in order to pierce the stopper of the tube 14. Once this has been done, the aspirator 80 (in this case a needle) is moved into the perforator 78 to take a sample of the biological liquid in the tube 14. Finally, a return device 83 returns the tube 14 to the rack 12 while the pusher 82 is retracted.

In the example described here, the pusher 82 is a finger that passes through a recess in the rail 62 and a corresponding opening in the bottom of the rack 12. The finger 82 is rigidly connected to a plate 84 that is moved along the axis Z by a cam 86 moved by a motor 88. The link between the finger 82 and the plate 84 is provided by a part 90 extending substantially in the direction Z. The part 90 is also linked to the returning device 83, that is made up of two rods 92 and one end 94 closest to the perforator 78 which is substantially rectangular and lies in the plane (X;Y) partially overhanging the stopper of tube 14 pierced by the perforator 78. Thus, when the part 90 is moved back downwards by the plate 84, the end 94 pushes the tube 14 into the rack 12.

The end 94 is mounted with clearance on the part 90. Thus, the end 94 is linked to the rods 92 by a block 100 that rests on two springs 102, each of which has a static link with a rod 92. This two-rod link ensures that the end 94 can only move along the axis Z.

The part 90 is adjusted such that the end 94 initially moves upwards with the finger 82 and the tube 14 pushed by this latter. When the end 94 approaches the sampling assembly, the block 100 encounters a stop 96. The rod 92 and the finger 82 then continue moving along the axis Z, while the spring 102 is compressed against the block 100. Once the sample has been taken, the part 90 moves back down and the spring 102 is released before the end 94 presses against the stopper of the tube 14, returning same gradually into the rack 12.

This is shown more clearly in FIGS. 13 to 15, which show the finger 82 and the part 90 moving until the perforator 78 pierces the stopper of the tube 14. In the example shown here, the tube 14 is the smallest type of tube that can be held by the rack 12. Consequently, the spring 102 is at maximum compression, the perforator 78 penetrates less deeply into the "furthest" tube 14 than with a larger tube 14. The finger 82 has a larger clearance than the end 94, and the spring 102 helps to prevent same from interfering with the perforator 78. Consequently, the sampling function is performed using a single actuator. In order to ensure that the tube 14 is correctly reinserted into the rack 12 and is not blocked by the portion 56 of the cover 54 when the guide 60 returns the rack 12 to the support 46 of the shaker 26, the end 94 has an inclined plane 104 that forces the tube 14 into the rack 12 if necessary.

Once the rack 12 is in place, another shaking process is performed and the following tube 14 is sampled in the same way, and so on until all of the tubes 14 have been sampled. The guide 60 then returns the rack 12 to the shaker 26 so that same can be removed, as shown in FIGS. 16 to 19.

To do so, the shaker 26 tilts the support 46 to an angular position that is nearly 180° from the insertion position of the rack 12 in the shaker 26. When the support 46 reaches an angular position of approximately 135° in relation to the angular insertion position (FIG. 17), the portion 58 of the cover 54 stops against the guide 60 and a spring 106 starts to be compressed, which results in the cover 54 ceasing to rotate, whereas the support 46 continues to do so. As the angle of the support 46 in relation to the angular insertion position continues to increase, the bottom of the rack 12 is gradually exposed between the portion 56 and the portion 58, until the portion 56 entirely ceases to retain same (FIG. 18). The rack 12 is then discharged from the shaker 26 by gravity.

The rack 12 then falls and slides down a slope 108 to the outlet 20 (FIG. 19). Advantageously, the portion of the slope 108 linking same to the outlet 20 is inclined in the direction Z along the direction X, such that the rack 12 is guided to the outlet 20 by gravity. If several racks 12 are removed successively, said racks are positioned one behind the other. If the outlet has a vertical offset at the end of the slope 108, for example above a receiving tray, the racks 12 can be stacked on top of one another, such that the tubes are substantially horizontal, as opposed to the substantially horizontal insertion thereof into the shaker 26.

In a variant, the rack 12 is discharged directly into a receiving tray or into any other member enabling said rack to be retrieved by gravity.

The invention therefore relates to a device for taking samples of biological liquids that is able to take a sample of a biological liquid in a tube, characterized in that it has a static perforator that is designed to pierce a stopper of a tube to be sampled, an aspirator that is designed to take a sample from a tube pierced by the perforator through this latter, and a pusher comprising a single actuator and designed to push a tube in front of the perforator against said perforator and to bring same back.

This device can have one or more of the following features:
  the pusher is moved by a part linked to a plate sliding on two rods and driven by a cam driven by a motor,
  the device has a return device having one end linked to the part by a block linked to springs, and
  the block is arranged to reach a stop so as to stop the end from moving while the pusher continues to move.

The invention claimed is:

1. A shaking and sample-taking device for biological liquids that is configured to take samples of biological liquids in a tube, comprising
  a shaker that is configured to mix a rack holding one or more tubes by performing a succession of tilting movements between two shaking positions, wherein the shaker is also arranged to tilt beyond the shaking position furthest from an insertion position of a rack to discharge the rack by gravity, wherein the shaker comprises an open support, and
  a cover that is arranged to prevent the rack from coming out of the shaker during shaking thereof and that is mounted rotatingly on the shaker in order to release the rack through an opening in the support when the shaker is tilted beyond the shaking position furthest away from the insertion position of the rack, and wherein the cover has a portion that butts against the shaker when the shaker reaches the shaking position furthest away from the insertion position of a rack, and a spring arranged to be compressed when the shaker tilts beyond this position, such that the cover does not prevent the rack from coming out.

2. The device of claim 1, further comprising a slope arranged to receive a rack discharged from the shaker and to guide the rack towards an outlet of the device.

3. The device of claim 2, wherein the slope has an incline oriented towards the outlet to guide a rack discharged from the device.

4. The device of claim 1, wherein the shaker performs a succession of tilting movements between two shaking positions located respectively at 0° and 120° in relation to the insertion position of the rack in the shaker.

5. The device of claim 1, further comprising retractable stops arranged to prevent a rack from interfering with the shaker when the shaker is already holding a rack.

6. The device of claim 1, further comprising
  a static perforator that is configured to pierce a stopper of a tube to be sampled,
  an aspirator that is configured to take a sample from a tube pierced by the perforator, and
  a pusher comprising a single actuator and configured to push a tube in front of the perforator against said perforator and to bring the tube back.

7. The device of claim 6, wherein the pusher is moved by a part linked to a plate driven by a cam driven by a motor, and a return device with one end linked to the part by a block linked to springs and arranged to butt against a stop in order to prevent the end from moving while the pusher continues to move.

8. A shaking and sample-taking method for biological liquids, comprising:
  inserting a rack in a shaker of a device of claim 1, mixing the rack holding one or more tubes by performing a succession of tilting movements between two shaking positions, taking at least one sample of biological liquids from one of the tubes shaken, tilting the shaker beyond the shaking position furthest away from an insertion position of a rack, and discharging the rack by gravity.

9. A shaking and sample-taking device for biological liquids that is configured to take samples of biological liquids in a tube, comprising a shaker that is configured to mix a rack holding one or more tubes by performing a succession of tilting movements between two shaking positions, wherein the shaker is also arranged to tilt beyond the shaking position furthest from an insertion position of a rack to discharge the rack by gravity, a static perforator that is configured to pierce a stopper of a tube to be sampled, an aspirator that is configured to take a sample from a tube pierced by the perforator, and a pusher comprising a single actuator and configured to push a tube in front of the perforator against said perforator and to bring the tube back.

10. The device of claim 9, further comprising a slope arranged to receive a rack discharged from the shaker and to guide the rack towards an outlet of the device.

11. The device of claim 10, wherein the slope has an incline oriented towards the outlet to guide a rack discharged from the device.

12. The device of claim 9, wherein the shaker performs a succession of tilting movements between two shaking positions located respectively at 0° and 1200 in relation to the insertion position of the rack in the shaker.

13. The device of claim 9, further comprising retractable stops arranged to prevent a rack from interfering with the shaker when the shaker is already holding a rack.

14. The device of claim 9, wherein the pusher is moved by a part linked to a plate driven by a cam driven by a motor, and a return device with one end linked to the part by a block linked to springs and arranged to butt against a stop in order to prevent the end from moving while the pusher continues to move.

15. A shaking and sample-taking method for biological liquids, comprising:

inserting a rack in a shaker of a device of claim 9, mixing the rack holding one or more tubes by performing a succession of tilting movements between two shaking positions, taking at least one sample of biological liquids from one of the tubes shaken, tilting the shaker beyond the shaking position furthest away from an insertion position of a rack, and discharging the rack by gravity.

* * * * *